(12) United States Patent
Lad et al.

(10) Patent No.: US 11,260,845 B2
(45) Date of Patent: Mar. 1, 2022

(54) VEHICLE CONTROL SYSTEM AND METHOD

(71) Applicant: Jaguar Land Rover Limited, Coventry (GB)

(72) Inventors: Manoj Lad, Coventry (GB); Matthew Hancock, Coventry (GB); Neil Dixon, Coventry (GB); Christopher Green, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 429 days.

(21) Appl. No.: 16/081,310

(22) PCT Filed: May 12, 2017

(86) PCT No.: PCT/EP2017/061444
§ 371 (c)(1),
(2) Date: Aug. 30, 2018

(87) PCT Pub. No.: WO2017/198560
PCT Pub. Date: Nov. 23, 2017

(65) Prior Publication Data
US 2019/0054913 A1  Feb. 21, 2019

(30) Foreign Application Priority Data
May 16, 2016  (GB) .................................. 1608578

(51) Int. Cl.
*B60W 10/08* (2006.01)
*B60W 50/00* (2006.01)
(Continued)

(52) U.S. Cl.
CPC .............. *B60W 10/08* (2013.01); *B60K 6/48* (2013.01); *B60K 6/547* (2013.01); *B60L 7/26* (2013.01);
(Continued)

(58) Field of Classification Search
CPC ...... B60W 10/08; B60W 20/00; B60W 20/30; B60W 50/0097; B60W 10/11;
(Continued)

(56) References Cited

U.S. PATENT DOCUMENTS 5,399,000 A    3/1995  Aoki et al.
6,126,251 A   10/2000  Yoshii et al.
(Continued)

FOREIGN PATENT DOCUMENTS

EP    2 474 434 A1    7/2012
EP    2 821 305 A1    1/2015
(Continued)

OTHER PUBLICATIONS

Patents Act 1977: Combined Search and Examination Report under Sections 17 and 18(3), UKIPO Application No. GB1608578.9, dated Nov. 11, 2016, 6 pp.
(Continued)

*Primary Examiner* — Aaron L Troost
(74) *Attorney, Agent, or Firm* — Reising Ethington P.C.

(57) ABSTRACT

A control system for a hybrid vehicle. The system comprises a controller configured to cause a net negative drive torque to be applied by an engine or an electric machine of the vehicle to the input shaft of a transmission in a direction opposing travel of the vehicle to effect braking, determine when a transmission gear shift is about to occur requiring a non-negative torque to be applied at the input shaft, and when the gear shift is about to occur, temporarily cause a net non-negative drive torque to be applied to the input shaft by causing the electric machine to apply a positive drive torque to the input shaft to compensate for negative torque applied by the engine, and cause brake force to be applied by a
(Continued)

braking system to compensate for a reduction in negative drive torque applied to the input shaft, while the gear shift occurs.

10 Claims, 5 Drawing Sheets

(51) Int. Cl.
| | | |
|---|---|---|
| *B60K 6/48* | (2007.10) | |
| *B60K 6/547* | (2007.10) | |
| *B60L 7/26* | (2006.01) | |
| *B60W 10/11* | (2012.01) | |
| *B60W 10/184* | (2012.01) | |
| *B60W 30/18* | (2012.01) | |
| *B60W 30/19* | (2012.01) | |
| *B60W 20/30* | (2016.01) | |
| *B60W 20/00* | (2016.01) | |

(52) U.S. Cl.
CPC .......... *B60W 10/11* (2013.01); *B60W 10/184* (2013.01); *B60W 20/00* (2013.01); *B60W 20/30* (2013.01); *B60W 30/18127* (2013.01); *B60W 30/19* (2013.01); *B60W 50/0097* (2013.01); *B60K 2006/4825* (2013.01); *B60W 2030/18081* (2013.01); *B60W 2540/10* (2013.01); *B60W 2540/12* (2013.01); *B60W 2710/0666* (2013.01); *B60W 2710/083* (2013.01); *B60W 2710/18* (2013.01); *Y02T 10/62* (2013.01)

(58) Field of Classification Search
CPC ......... B60W 10/184; B60W 30/18127; B60W 30/19; B60W 2030/18081; B60W 2540/10; B60W 2540/12; B60W 2710/0666; B60W 2710/083; B60W 2710/18; B60W 20/14; B60W 10/06; B60K 6/48; B60K 6/547; B60K 2006/4825; B60L 7/26; Y02T 10/62; F16H 61/04; F16H 2061/0422

See application file for complete search history.

(56) References Cited

U.S. PATENT DOCUMENTS

| | | | |
|---|---|---|---|
| 9,340,199 B1 | 5/2016 | Nefcy et al. | |
| 2003/0200016 A1 | 10/2003 | Spillane et al. | |
| 2012/0265382 A1* | 10/2012 | Nefcy ................ | B60W 10/115 701/22 |
| 2014/0330474 A1* | 11/2014 | Tsuda ................ | B60W 10/115 701/22 |
| 2017/0166194 A1* | 6/2017 | Kumazaki ............ | B60W 20/14 |

FOREIGN PATENT DOCUMENTS

| | | |
|---|---|---|
| GB | 2 308 415 B | 2/1999 |
| GB | 2 325 716 B | 2/1999 |
| GB | 2 341 430 B | 3/2002 |
| GB | 2 381 597 B | 5/2005 |
| GB | 2 382 158 B | 7/2005 |
| GB | 2499252 A | 8/2013 |
| GB | 2483371 B | 2/2014 |
| GB | 2492655 B | 5/2014 |
| GB | 2492748 B | 5/2014 |
| WO | WO 2009/080901 A1 | 7/2009 |

OTHER PUBLICATIONS

Patents Act 1977: Combined Search and Examination Report under Sections 17 and 18(3), UKIPO Application No. GB1707600.1, dated Oct. 23, 2017, 8 pp.

International Search Report and Written Opinion of the International Searching Authority, International Application No. PCT/EP2017/061444, dated Jul. 21, 2017, 13 pp.

\* cited by examiner

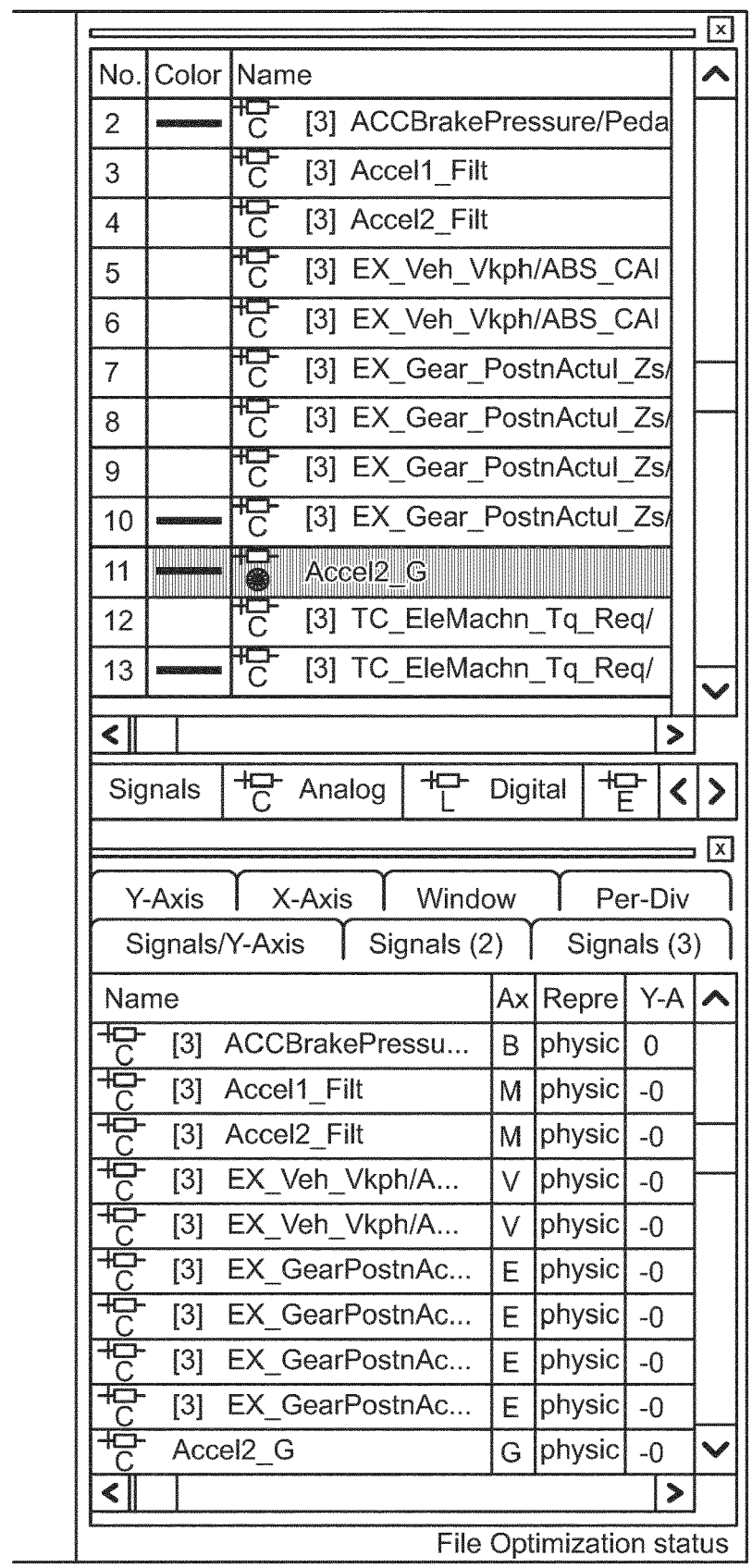
FIGURE 3 - continued

VEHICLE CONTROL SYSTEM AND METHOD

RELATED APPLICATIONS

This application is a 35 U.S.C. § 371 national stage application of PCT Application No. PCT/EP2017/061444, filed on May 12, 2017, which claims priority from Great Britain Patent Application No. GB1608578.9, filed on May 16, 2016, the contents of which are incorporated herein by reference in their entireties. The above-referenced PCT International Application was published in the English language as International Publication No. WO 2017/198560 A1 on Nov. 23, 2017.

INCORPORATION BY REFERENCE

The entire contents of co-pending UK patent application GB2499252 and UK patents GB2492748, GB2492655, GB2325716, GB2308415, GB2341430, GB2382158, GB2381597 and GB2483371 are expressly incorporated herein by reference. The content of US patent application US2003/0200016 is also hereby incorporated by reference.

TECHNICAL FIELD

The present invention relates to a control system for a vehicle, preferably but not exclusively a hybrid electric vehicle. Embodiments of the present invention provide a control system for a vehicle, a vehicle, a method of controlling a vehicle, a non-transitory computer readable carrier medium carrying a computer readable code, a computer program product executable on a processor, a computer readable medium and a processor.

BACKGROUND

It is known to provide a parallel hybrid electric vehicle having an internal combustion engine and an electrical propulsion motor each operable to provide drive torque to drive the vehicle. In some known arrangements the engine and motor can provide drive torque alone or in combination.

The propulsion motor is powered by a propulsion battery. In some so-called 'mild hybrid' vehicles the propulsion motor is configured to provide torque boost to supplement drive torque produced by the engine. The propulsion motor may also be configured to act as a generator, applying negative drive torque to the driveline in order to effect regenerative braking. Recharging of the battery may be effected when the motor is operated as a generator.

In some known vehicles, the vehicle may be operated in an electric vehicle (EV) mode in which the engine is switched off and the electrical propulsion motor provides drive torque to drive the vehicle as required. The vehicle may also be operated in a parallel mode in which the engine is switched on and the electrical propulsion motor is operable either to provide drive torque in addition to the engine, in a parallel boost mode, or to generate electrical charge to recharge the propulsion battery, in a parallel recharge mode. A vehicle control system determines when to switch the internal combustion engine on or off, and when to open or close a clutch K0 between the engine and a transmission. In some vehicles the electric propulsion motor is integrated into the transmission.

The present applicant has identified a problem when endeavouring to employ certain transmissions in known hybrid electric vehicle powertrains. Certain transmission gear changes require a non-negative drive torque to be applied to the input shaft of the transmission during the gear change. It is to be understood that, in the event that the hybrid vehicle has an electric machine applying negative drive torque to the input shaft of the transmission in addition to the engine, in order to effect regenerative braking, the amount of negative drive torque at the input shaft may be large when compared with the amount when brake force is applied directly to the wheels by a braking system rather than via the transmission input shaft.

Embodiments of the present invention endeavour to mitigate this problem in order to provide an electric or hybrid electric vehicle that is capable of effecting regenerative braking without unduly compromising vehicle performance.

SUMMARY OF THE INVENTION

Embodiments of the invention may be understood with reference to the appended claims.

Aspects of the present invention provide a control system, a vehicle and a method.

In one aspect of the invention for which protection is sought there is provided a control system for a vehicle having at least one electric machine configured to cause torque to be applied to an input shaft of a transmission, the control system being configured to:

cause a net negative drive torque to be applied, at least in part by means of the electric machine, to the input shaft of the transmission in a direction opposing travel of the vehicle in order to effect braking;

determine when a transmission gear shift is about to take place requiring a non-negative torque to be applied at the input shaft of the transmission; and when a net negative drive torque is being applied to the input shaft of the transmission and it is determined that a gear shift is about to take place requiring a non-negative torque to be applied, temporarily cause a net non-negative drive torque to be applied to the input shaft and cause brake force to be applied to one or more wheels of the vehicle by a second braking means to compensate for the reduction in negative drive torque applied to the input shaft of the transmission, whilst the transmission gear shift takes place.

The vehicle may be an electric only vehicle, or may be a hybrid vehicle having an engine, wherein the net-negative drive torque is caused by means of one or both of the engine and electric machine.

Embodiments of the present invention have the advantage that an electric or hybrid electric vehicle can be provided that is capable of effecting regenerative braking and facilitating gear changes in transmissions requiring non-negative drive torque at the input shaft thereof whilst certain gear changes take place.

It is to be understood that the brake force may be applied to the one or more wheels by means of second braking means comprising a friction-based foundation braking system and/or any other suitable braking means. Such braking means may comprise an electric machine downstream of the transmission in a torque path from the transmission to one or more wheels. Such an electric machine may for example be comprised by an axle of the vehicle such as a rear axle, as for example in an electric rear-axle drive (ERAD) arrangement, or by means of wheel hub-mounted electric machines or the like.

Optionally, the system is configured to receive a drive demand signal indicative of an amount of drive torque required of a powertrain of the vehicle, the system being configured to cause negative drive torque to be applied at least in part by means of the electric machine in dependence at least in part on the drive demand signal.

It is to be understood that the drive demand signal may be indicative of the position of an accelerator control device such as an accelerator pedal. If the vehicle is moving and the drive demand signal indicates that the accelerator control device is in a substantially fully released condition, the control system may determine that the electric machine should be operated in an overrun condition in which the electric machine applies negative torque to the driveline to simulate engine overrun braking, also referred to as compression braking. It is to be understood that, if the engine remains coupled to the driveline when the accelerator control device is in the released condition, the engine may provide overrun braking in addition to the electric machine. It is to be understood that in the case of an accelerator pedal, a transition of the pedal from a depressed condition to a released condition may be referred to as 'tip out'.

In some embodiments, the control system may be arranged to cause the electric machine to apply an amount of negative torque, simulating engine braking, sufficient to cause the net amount of engine braking to be equivalent to that of an engine of a size comparable with that which would be required to deliver the combined maximum amount of positive torque that the electric machine and engine are capable of producing, i.e. an amount greater than the installed engine of the vehicle alone. In some alternative embodiments the control system may be arranged to cause the electric machine to apply an amount of negative torque such that the net amount of negative torque applied is greater than that which would be provided by an engine of a size comparable with that required to deliver the combined maximum amount of positive torque that the electric machine and engine are capable of producing.

Optionally, the system is configured to receive a brake force demand signal indicative of an amount of brake force required, the system being configured to cause negative drive torque to be applied at least in part by means of the electric machine in dependence at least in part on the brake force demand signal.

It is to be understood that the brake force demand signal may be generated for example by a user depressing a brake pedal, or by a speed control system such as an active cruise control system. The amount of negative torque applied by the electric machine providing overrun braking may therefore be increased in response to this signal. The electric machine may generate electrical energy when applying negative drive torque thereby effecting regenerative braking.

Alternatively or in addition, the second braking means may respond to requests for brake torque via the brake force demand signal.

Optionally, in the case of a hybrid vehicle, the system may be configured to cause a net non-negative drive torque to be applied to the input shaft of the transmission at least in part by causing the engine to apply a positive drive torque to the input shaft of the transmission.

Optionally, the system is configured to cause a net non-negative drive torque to be applied to the input shaft of the transmission at least in part by causing the electric machine to apply a positive drive torque to the input shaft of the transmission.

Optionally, the system is configured to command application of brake torque by the second braking means, to compensate for the reduction in negative drive torque applied to the input shaft of the transmission, a predetermined time period prior to the transmission gear shift taking place.

This feature has the advantage that any lag in the application of brake torque by the second braking means following the commanding of brake torque application by the second braking means may be accommodated by commanding brake torque application in advance of the gear shift taking place.

Optionally, the system comprises an electronic processor having an electrical input for receiving a signal indicating that a transmission gear shift is about to take place requiring a non-negative torque to be applied at the input shaft of the transmission, and an electronic memory device electrically coupled to the electronic processor and having instructions stored therein, wherein the processor is configured to access the memory device and execute the instructions stored therein such that it is operable to determine, based on the received signal, when a transmission gear shift is about to take place requiring a non-negative torque to be applied at the input shaft of the transmission, and, when a net negative drive torque is being applied to the input shaft of the transmission and it is determined that a gear shift is about to take place requiring a non-negative torque to be applied, temporarily cause a net non-negative drive torque to be applied to the input shaft and cause brake force to be applied to one or more wheels of the vehicle by the second braking means to compensate for the reduction in negative drive torque applied to the input shaft of the transmission, whilst the transmission gear shift takes place.

In a further aspect of the invention for which protection is sought there is provided a motor vehicle comprising a control system according to another aspect.

In one aspect of the invention for which protection is sought there is provided a method of controlling a vehicle having at least one electric machine configured to cause torque to be applied to an input shaft of a transmission, the method being implemented by a control system and comprising:

causing a net negative drive torque to be applied, at least in part by means of the electric machine, to the input shaft of the transmission in a direction opposing travel of the vehicle in order to effect braking;

determining when a transmission gear shift is about to take place requiring a non-negative torque to be applied at the input shaft of the transmission; and when a net negative drive torque is being applied to the input shaft of the transmission and it is determined that a gear shift is about to take place requiring a non-negative torque to be applied, temporarily causing a net non-negative drive torque to be applied to the input shaft and causing brake force to be applied to one or more wheels of the vehicle by a second braking means to compensate for the reduction in negative drive torque applied to the input shaft of the transmission, whilst the transmission gear shift takes place.

The vehicle may be an electric only vehicle, or may be a hybrid vehicle having an engine, wherein the net-negative drive torque is caused by means of one or both of the engine and electric machine.

The method may comprise commanding application of brake torque by the second braking means, to compensate for the reduction in negative drive torque applied to the input shaft of the transmission, a predetermined time period prior to the transmission gear shift taking place.

The method may comprise determining when the transmission gear shift will take place in dependence at least in part on information indicative of an instant speed of the transmission, and information indicative of a speed of the transmission at which a gear shift will take place.

In an aspect of the invention for which protection is sought there is provided a non-transitory computer readable carrier medium carrying a computer readable code for controlling a vehicle to carry out the method of another aspect.

In a further aspect of the invention for which protection is sought there is provided a computer program product executable on a processor so as to implement the method of another aspect.

In an aspect of the invention for which protection is sought there is provided a computer readable medium loaded with the computer program product of another aspect.

In a further aspect of the invention for which protection is sought there is provided a processor arranged to implement the method or the computer program product of another aspect.

In another aspect of the invention there is provided a control system for a hybrid electric vehicle having an engine and at least one electric machine each configured to cause torque to be applied to an input shaft of a transmission, the control system being configured to:
 cause a net negative drive torque to be applied, at least in part by means of the electric machine, to the input shaft of the transmission in a direction opposing travel of the vehicle in order to effect braking;
 determine when a transmission gear shift is about to take place requiring a non-negative torque to be applied at the input shaft of the transmission; and
 when a net negative drive torque is being applied to the input shaft of the transmission and it is determined that a gear shift is about to take place requiring a non-negative torque to be applied, temporarily cause, by means of one or both of the engine and electric machine, a net non-negative drive torque to be applied to the input shaft and cause brake force to be applied to one or more wheels of the vehicle by a second braking means to compensate for the reduction in negative drive torque applied to the input shaft of the transmission, whilst the transmission gear shift takes place.

In another aspect of the invention there is provided a method of controlling a hybrid electric vehicle having an engine and at least one electric machine each configured to cause torque to be applied to an input shaft of a transmission, the method being implemented by a control system and comprising:
 causing a net negative drive torque to be applied, at least in part by means of the electric machine, to the input shaft of the transmission in a direction opposing travel of the vehicle in order to effect braking;
 determining when a transmission gear shift is about to take place requiring a non-negative torque to be applied at the input shaft of the transmission; and
 when a net negative drive torque is being applied to the input shaft of the transmission and it is determined that a gear shift is about to take place requiring a non-negative torque to be applied, temporarily causing, by means of one or both of the engine and electric machine, a net non-negative drive torque to be applied to the input shaft and causing brake force to be applied to one or more wheels of the vehicle by a second braking means to compensate for the reduction in negative drive torque applied to the input shaft of the transmission, whilst the transmission gear shift takes place.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The speed controller may be implemented in software run on one or more processors. One or more other controllers may be implemented in software run on one or more processors, optionally the same one or more processors as the speed controller. Other arrangements may also be useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described with reference to the accompanying figures in which.

DETAILED DESCRIPTION

Figure 1:
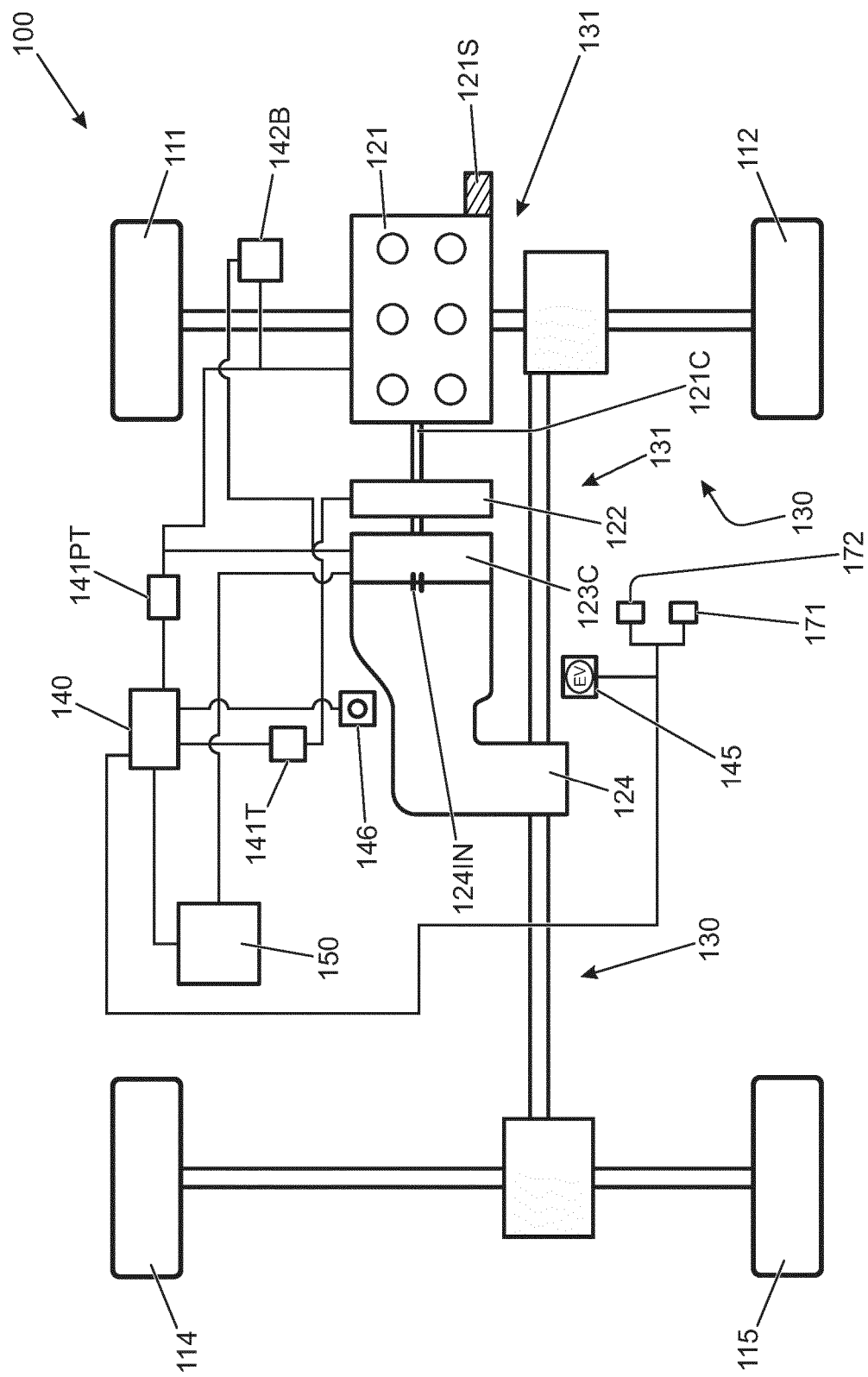
FIG. 1 is a schematic illustration of a hybrid electric vehicle according to an embodiment of the present invention.

In one embodiment of the present invention a hybrid electric vehicle 100 is provided as shown in FIG. 1. The vehicle 100 has an engine 121 and a dedicated starter motor 121S operable to crank the engine 121 when starting is required.

The engine 121 is coupled in turn to a crankshaft-integrated motor/generator (CIMG) 123C by means of a crankshaft 121C and clutch 122. The clutch 122 may also be referred to as a K0 clutch 122. The CIMG 123C is also operable to crank the engine 121 when required.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, and engine 121 may be considered to form part of a powertrain 131 of the vehicle 100. Wheels 111, 112, 114, 115 arranged to be driven by the driveline 130 may also be considered to form part of the powertrain 131. The transmission 124 is controlled by means of a transmission controller 141T.

It is to be understood that other arrangements are also useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The CIMG 123C is electrically coupled to a charge storage module 150 (which may also be referred to as an energy storage module 150) having a battery and an inverter. The module 150 is operable to supply the CIMG 123C with electrical power when operated as a propulsion motor. Similarly, the module 150 may receive and store electrical power generated by the CIMG 123C when operated as an electrical generator.

The vehicle 100 has a vehicle controller 140 operable to command a powertrain controller 141PT to control the engine 121 to switch on or off and to generate a required amount of torque. The vehicle controller 140 is also operable to command the CIMG 123C to apply a required value of positive or negative torque (operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W. In some embodiments, the powertrain controller 141PT is arranged to receive the accelerator pedal position signal and calculate the amount of driver demanded torque.

The vehicle 100 of FIG. 1 is operable by the vehicle controller 140 in an electric vehicle (EV) mode in which the clutch 122 is open and the crankshaft 121C is substantially stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a 'parallel boost' mode in which the CIMG 123C is operated as a motor to provide drive torque to the driveline 130 in addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand, since the CIMG 123C is typically able to respond more quickly to torque requests than the engine 121.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption. Torque-assist may be considered to be distinct from 'torque filling', the latter being employed in a transient manner when an increase in drive torque is required.

The powertrain 131 may alternatively be operated in a parallel recharge mode in which the CIMG 123C is driven as a generator by the engine 121 to recharge the charge storage module 150.

The vehicle 100 has a hybrid mode selector control 145 in the form of a rotatable dial. The selector control 145 is operable to select one of three hybrid modes: an EV mode, a hybrid mode and a hybrid inhibit mode.

In the EV mode, the controller 140 causes the engine 121 to remain switched off whilst propulsion torque is delivered, as required, by means of the CIMG 123C only. Once the state of charge of the charge storage module 150 falls below a predetermined amount, for example below 10% of a maximum usable charge capacity, the controller 140 causes the engine 121 to be switched back on and the powertrain 131 to assume the parallel recharge mode until the state of charge exceeds a predetermined value, for example 25% of a maximum usable charge capacity.

In the hybrid mode, the controller 140 causes the powertrain 131 to assume a parallel mode or the EV mode in dependence on an energy management methodology (also referred to as a strategy) implemented by the controller 140. Further details of the energy management methodology may be found in GB2483371. The controller 140 seeks to balance the use of charge stored in the charge storage module 150 to operate the CIMG 123C as a propulsion motor and the burning of fuel by the engine 121 in order to reduce emission of greenhouse gases such as carbon dioxide. Other energy management methodologies may be useful in some embodiments.

In the hybrid inhibit mode, the controller 140 latches the engine 121 in the on condition and the K0 clutch 122 in the closed condition and causes the engine 121 to drive the transmission 124 substantially continually whilst the transmission 124 is in a driving mode in which drive torque may be delivered by the transmission 124 to the road wheels 111, 112, 114, 115.

The brake controller 142B is operable to cause a friction-based foundation braking system to cause braking of each of the road wheels 111, 112, 114, 115. The brake controller 142B is also operable to command the powertrain controller 141PT to cause the CIMG 123C to act as a generator and apply negative torque to the driveline 130 in order to cause braking. This may be referred to as regenerative braking since charge generated by the CIMG 123C in effecting braking may be stored in the charge storage module 150.

The transmission 124 is configured such that, when a gear shift takes place between certain gears, in the present embodiment a gear shift from forward drive gear 8 to a lower forward drive gear such as forward drive gear 7, or a shift from gear 5 to gear 4, a net non-negative amount of torque must be present at the input shaft of the transmission 124. That is, the amount of torque must be substantially zero or positive. This is because an interference clutch of the dog-type is required to be engaged as part of the gear shift.

In conventional non-HEV vehicles, that do not effect regenerative braking, or in vehicles where regenerative braking is effected at a location of the powertrain downstream of the transmission 124 with respect to a torque transfer path from the engine 121 to the wheels 111, 112, 114, 115, the engine 121 is the only prime mover coupled to the input shaft of the transmission 124. The amount of negative torque applied to the transmission 124 by the engine 121 when the accelerator pedal is released and the vehicle 100 slows from a speed above creep speed is sufficiently small that the engine 121 can be caused to apply non-negative torque to the transmission 124 relatively quickly and transiently by the powertrain controller 141PT whilst the gear change takes place. This may be achieved for example by automatically transiently fuelling the engine and commencing transient fuelling immediately prior to the gear change taking place.

In contrast, in embodiments of the present invention, the amount of negative torque applied to the transmission 124 by the engine 121 in combination with that applied by the CIMG 123C when regenerative braking is being effected is relatively large. Transiently removing this negative torque, causing a non-negative amount of torque to be applied to the transmission 124, would result in an unacceptably high amount of jerk of the vehicle 100.

By way of example, the amount of engine overrun braking torque developed by the engine 121 upon accelerator pedal release may be relatively low, at around −20 Nm in some vehicles. When a gear change takes place in a non-hybrid vehicle having such a transmission, the engine 121 may be temporarily caused to develop an additional 20N of torque, causing the net engine output shaft torque to become substantially zero. Such a torque increase is relatively small and typically does not cause unacceptable jerk of the vehicle 100. However it is desirable to operate the CIMG 123C such that a negative torque level of around −70 to −80 Nm is applied following accelerator pedal lift-off. To reduce this amount of torque to substantially zero in a relatively short period of time would result in an unacceptable level of jerk, i.e. rate of change of acceleration.

In order to facilitate the provision of a non-negative amount of torque at the input to the transmission input shaft 1241N during a gear change for which a non-negative amount of torque must be applied, the controller 140 is configured to determine when such a gear change is about to take place. The controller 140 then causes the CIMG 123C to generate an amount of positive torque (instead of negative torque) sufficient to compensate for the negative torque applied by the engine 121 such that the net torque applied to the transmission input shaft 1241N is substantially zero. In some embodiments the controller causes the amount of torque applied by the CIMG 123C to be sufficiently high that the net torque applied to the transmission input shaft 1241N is substantially greater than zero. In some embodiments the amount of torque applied by the CIMG 123C is reduced substantially to zero and fuelling of the engine 121 takes place sufficient to reduce the amount of overrun braking torque also substantially to zero.

The controller 140 also causes the brake controller 142B to command application of brake force to the wheels 111, 112, 114, 115 by means of the foundation braking system in order to compensate for the reduction in negative torque applied to the transmission input shaft 1241N. The brake controller 142B attempts to cause the brake torque to be applied such that the vehicle 100 continues to decelerate at substantially the same rate during the gear shift as before the gear shift, with little or no jerk experienced by the driver due to the change in net torque at the input shaft 1241N. Thus it is to be understood that the foundation braking system is employed to compensate for the reduction in the amount of negative torque applied by the CIMG 123C.

Figure 2:
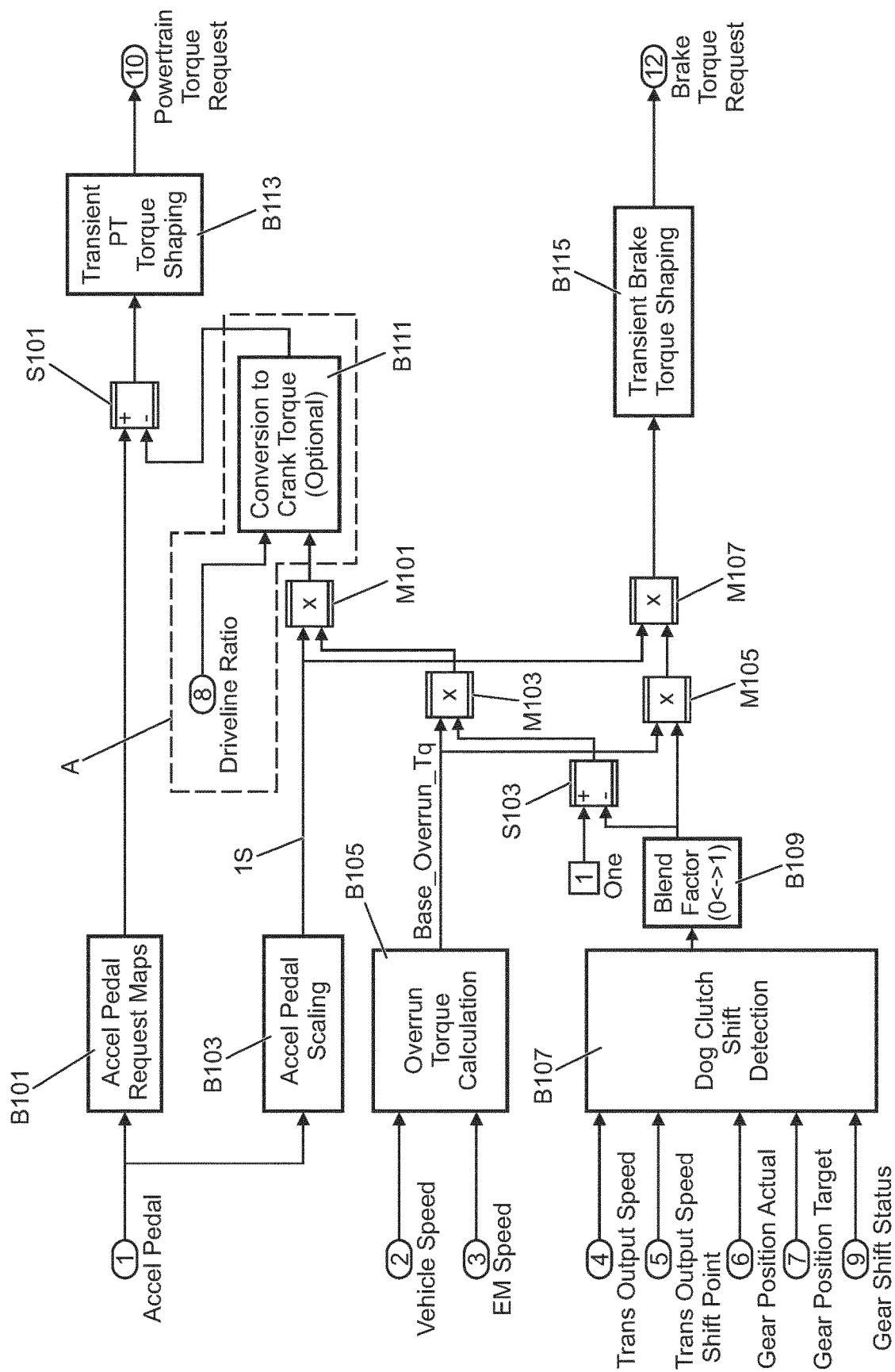
FIG. 2 is a schematic illustration of a controller according to an embodiment of the present invention.

FIG. 2 is a schematic illustration of the manner in which the vehicle controller 140 controls the powertrain controller 141PT and brake controller 142B in order to achieve this.

The vehicle controller 140 receives the following signals:
(a) accelerator pedal position signal 1;
(b) vehicle reference speed signal 2, corresponding to vehicle speed over ground;
(c) CIMG 123C speed of rotation signal 3;
(d) Transmission output shaft speed signal 4;
(e) Transmission output shaft shift point signal 5, corresponding to the transmission output speed at which a gear shift will be triggered;
(f) An actual gear position signal 6 indicative of the gear in which the transmission 124 is currently operating;
(g) A target gear position signal 7 indicative of the gear into which the transmission 124 is to change;
(h) A gear shift status signal 9 indicative of whether a gear shift is currently taking place.

In some embodiments, the controller 140 also receives a driveline ratio signal 8 indicative of the currently selected driveline ratio; in the present embodiment this ratio is fixed since a switchable high/low driveline ratio gear box is not provided and this signal is not provided. Thus, portion A of FIG. 2 (described below) is not provided in the present embodiment.

It is to be understood that methods of calculating the vehicle reference speed signal 2 are well known in the art, and include for example setting the reference speed signal 2 to the speed of the second slowest turning wheel. Other methods of generating a vehicle reference speed signal 2 may be useful in some embodiments.

The controller 140 implements computer code that performs a variety of functions. For ease of description, the various functions will be described as 'function blocks'. Reference to the functions as 'blocks' is not to be understood to be in any way limiting in the manner in which functionality is implemented. In some embodiments one or more of the functions may be implemented by means of discrete components in an analogue manner rather than via computer code.

With reference to FIG. 2, function block B101 receives the accelerator pedal position signal 1 and applies the signal 1 to a torque request map to obtain a value of powertrain torque corresponding to the signal 1. The block B101 may in some embodiments take one or more additional parameters into account such as engine speed, for example based on an engine speed signal or CIMG speed signal 3 which will be substantially equal to the engine speed when clutch K0 is closed. Block B101 outputs the powertrain torque value to a summing function block S101.

Function block B103 applies an accelerator pedal scaling function to the accelerator pedal position signal 1 and generates a scaled accelerator pedal position signal 1S. The scaled pedal signal 1S is applied to a multiplier function block M101.

The vehicle reference speed signal 2 and CIMG speed signal 3 are applied to an overrun torque calculation function block B105, being computer code that calculates a base value of required overrun torque, Base_Overrun_Tq based on a target value of deceleration as a function of vehicle speed when the accelerator pedal is in a fully released position. By overrun torque is meant the amount of negative torque to be applied to the transmission input shaft 1241N by the engine 121 and CIMG 123C in combination. The value of Base_Overrun_Tq is applied to a multiplier function block M103.

The transmission output speed signal 4, transmission output shaft shift point signal 5, actual gear position signal 6 indicative of the gear in which the transmission 124 is currently operating, target gear position signal 7 indicative of the gear into which the transmission 124 is to change and gear shift status signal 9 are applied to a dog clutch shift detection function block B107. Function block B107 is configured to determine when a 'torque-critical' gear change is to take place involving operation of a dog clutch of the transmission 124, in which non-negative drive torque must be applied to input shaft 1241N of the transmission 124. The function block B107 sets an output signal to 'TRUE' a predetermined period prior to the gear change commencing. In the present embodiment, the predetermined period is 350 ms although other periods may be useful in some embodiments such as 250 ms, 500 ms or any other suitable value. The output signal is communicated to a blend factor function block B109.

It is to be understood that the function block B107 calculates the amount of time before a torque-critical gear shift is likely to take place based on the rate of change of transmission output shaft speed, calculated from transmission output shaft speed signal 4, and the transmission output shaft shift point signal 5. The function block B107 determines the amount of time that will likely elapse before the transmission output shaft speed becomes substantially equal to the speed at which the transmission shift will take place. The function block B107 then sets the output thereof to TRUE during the period in which the amount of this time is less than or equal to 350 ms as noted above. Once the output of the function block B107 is set to TRUE, blending is commenced in which the blend factor function block B109 outputs a signal that transitions from 0 to 1 in increments of 0.1 over the predetermined time period, which in the present embodiment is 350 ms as noted above. Thus the signal transitions in steps of 35 ms at a rate of 1 step per 0.1 s.

In some alternative embodiments, the transmission controller 141T may be configured to predict when a torque-critical gear shift will occur, and transmit a signal to the powertrain controller 141PT indicating that such a gear shift will occur in a predetermined amount of time from substantially the instant the signal is transmitted. The predetermined amount of time may be any suitable period such as 250 ms, 350 ms, 500 ms or any other suitable period. The controller 140 may cause the transition to the application of non-negative drive torque at the transmission input shaft 1241N, and corresponding application of compensating foundation braking when the transmission controller 141T transmits the signal to the powertrain controller 141PT indicating that such a torque-critical gear change will occur in the predetermined amount of time.

In some still further embodiments, the transmission controller 141T may be configured to output a probability signal indicative of when a torque-critical shift will occur. The probability signal may indicate a probability of a shift of substantially zero a predetermined period before shift commencement, the probability signal transitioning to indicate a probability of a shift of substantially 1 as the shift point approaches. The transition to the application of non-negative drive torque at the transmission input shaft 1241N, with corresponding application of compensating foundation braking, may take place as the probability signal transitions from 0 to 1 in an analogous manner to that in which the transition takes place in response to the output of blend factor function block B109 in the present embodiment.

Other arrangements may be useful in some embodiments.

With reference to FIG. 2, summing function block S103 receives the output of blend factor function block B109 at a subtraction input thereof and a signal corresponding to '1' at a summing input thereof. The summing function block S103 outputs to multiplier function block M103 a signal corresponding to the difference between the input signals at the summing and subtraction inputs. Multiplier function block M103 in turn multiplies the signals input thereto and outputs the product of the signals to multiplier function block M101. Multiplier function block M101 in turn multiplies the signals input thereto and outputs the product of the signals to summing function block S101. In some embodiments in which the vehicle 100 is provided with a high/low (or 'hi/lo') ratio gearbox in addition to the transmission 124, portion A of FIG. 2 may be provided. That is, the multiplier function block M101 output signal is provided to a crank torque conversion function block B111 that also receives a signal 8 indicative of the currently selected gear ratio of the hi/lo ratio box. The output of crank torque conversion function block B111 is dependent on signal 8 as well as the signal received from multiplier function block M101 and enables the controller 140 to compensate for changes in wheel torque for a given transmission output shaft torque due to the setting of the hi/lo ratio box, when provided.

Summing function block S101 receives at a summing input thereof the output signal generated by function block B101 and at a subtraction input thereof the output signal generated by the multiplier function block M101. The output of the summing function block S101, corresponding to the difference between the input signals, is fed to a transient powertrain torque shaping function block B113 that outputs a powertrain torque request signal 10 to the powertrain controller 140PT.

It is to be understood that the controller 140 is configured such that blocks S103, M103 and M105 are arranged to cause powertrain overrun torque to blend out and brake torque delivered by the foundation braking system to blend in as the output of the blend factor function block B109 transitions from 0 to 1.

The output of multiplier function block M105, together with that of function block B103, is fed to multiplier function block M107. The product of the signals is then fed to transient brake torque shaping function block B115 whose output is passed to brake controller 142B in the form of a brake torque request signal 12.

The transient powertrain torque shaping function block B113 and transient brake torque shaping function block B115 are arranged to compensate for the different transient responses of the powertrain (delivering torque by means of the engine 121 and CIMG 123C) and braking system. The blocks B113, B115 ensure that the net amount of torque delivered to driven wheels 111, 112, 114, 115 remains substantially unchanged during the blend period.

Once the gear shift is completed, the output of function block B107 is set to FALSE and the blend factor function block B109 generates an output signal that transitions from '1' to '0' over a predetermined time period, in the present embodiment 350 ms. The amount of brake force generated by the braking system is reduced during this period, whilst the amount of negative drive torque generated by the powertrain is increased to restore regenerative braking substantially as it was provided prior to the gear shift being commenced.

In the present embodiment, completion of a gear shift is detected in dependence on a signal generated by the transmission controller 140T indicative that the gear shift has been completed.

In some embodiments, the powertrain controller 140PT monitors 'torque up' intervention (i.e. the change in powertrain output torque to cause non-negative drive torque to be applied to the transmission input shaft 124IN) and determines that the gear shift is complete when 'torque up' is removed. The powertrain controller 140PT may output a signal indicative that 'torque up' intervention has terminated, enabling one or more functions requiring knowledge of this to respond accordingly.

Figure 3:
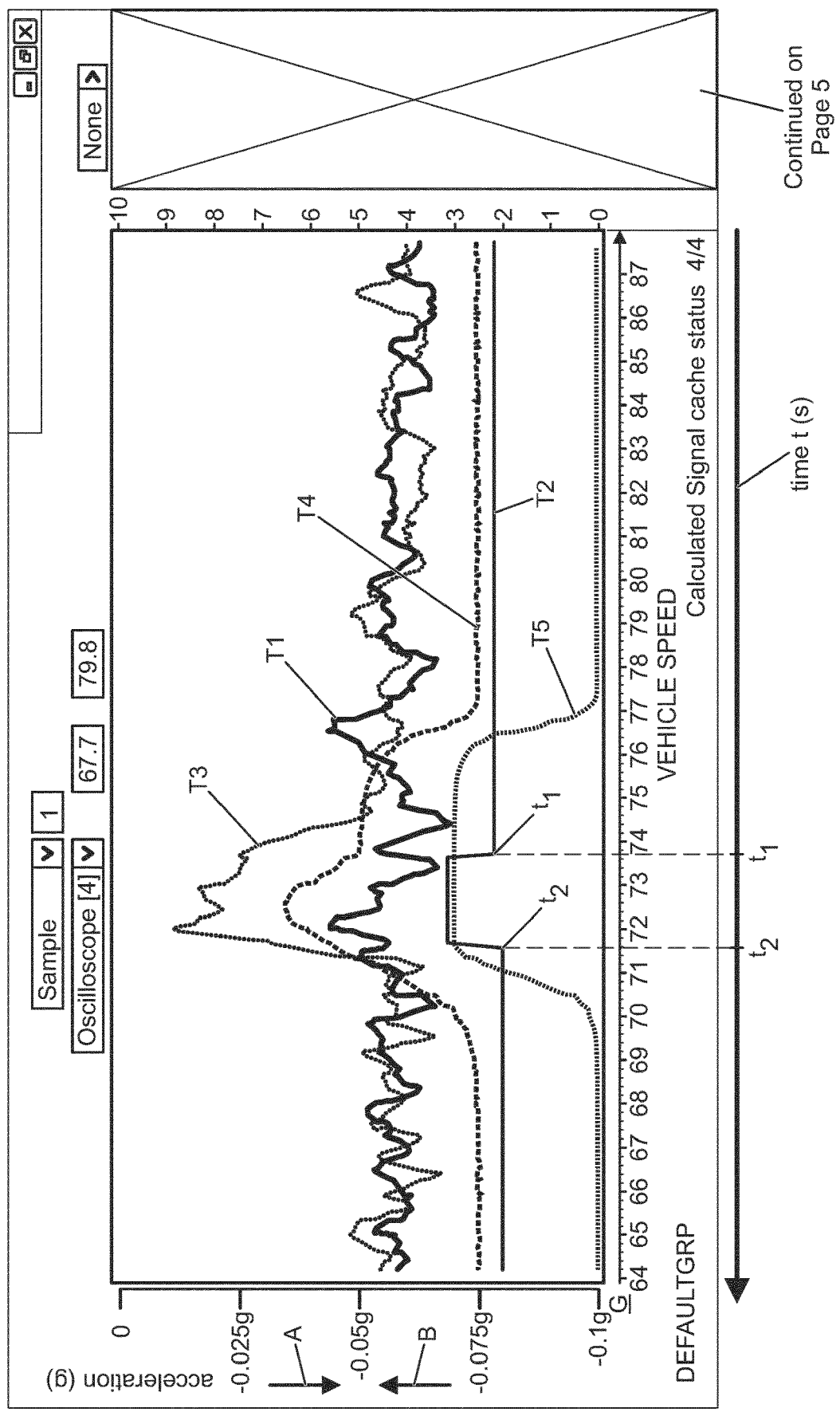
FIG. 3 is a is a graphical illustration of a method according to an embodiment of the invention in which the horizontal (x) axis represents vehicle speed, increasing from left to right (whilst time increases from right to left) and the vertical (y) axis shows rate of change of speed (acceleration)

FIG. 3 illustrates graphically aspects of the operation of the controller 140 described above. The horizontal (x) axis of FIG. 3 represents vehicle speed, increasing from left to right. Since the present invention relates to vehicle control during braking, it is to be noted that the sequence of events illustrated in FIG. 3 (from left to right) occur as vehicle speed decreases, i.e. time elapses from right to left in FIG. 3, as indicated by the 'time' arrow below the x-axis. The vertical (y) axis shows rate of change of speed (acceleration), becoming increasingly negative from top to bottom in the plot of FIG. 3.

Trace T1 shows the rate of change of speed experienced by the vehicle 100 (which is negative in the figure since the vehicle 100 is decelerating) during deceleration of the vehicle 100 when a gear change takes place requiring non-negative drive torque at the transmission input shaft 124IN. It can be seen that the rate of deceleration is substantially constant throughout the period of braking including the period during which the gear change takes place. The speed range (and hence relative time) at which the gear change takes place in the illustrated example is shown by trace T2, with the gear change commencing at time t1 and terminating at time t2, with respect to an arbitrary time axis which is not necessarily linear in the figure (which is linear with speed, but the rate of deceleration of the vehicle 100 fluctuates as shown by trace T1).

By way of contrast, trace T3 shows the rate of change of speed that would be experienced by the vehicle 100 if the controller 140 was not configured to apply the foundation braking system to compensate for the decrease in rate of deceleration (to less negative values of rate of change of speed, optionally substantially zero or positive values of rate of change of speed, i.e. positive acceleration) when 'torque up' intervention takes place. A substantial decrease in the rate of deceleration can be seen to occur immediately prior to the gear change, when the 'torque up' operation takes place.

Trace T4 illustrates schematically the manner in which the amount of negative torque generated by the engine 121 and CIMG 123C is decreased by the controller 140, by transmitting appropriate signals to the powertrain controller 141PT, in advance of the gear change, the vertical (y) axis representing the amount of torque (being increasingly negative moving from the top to the bottom of the illustration in the direction of arrow A). Trace T5 illustrates schematically the manner in which the amount of negative torque generated by the braking system is caused to increase in advance of the gear change, the vertical (y) axis representing the amount of brake torque, the amount of brake torque being increasingly negative moving from the bottom to the top of the illustration, in the direction of arrow B. It can be seen that the amount of brake torque applied by the braking system is increased ('ramped up') as the amount of negative drive torque applied by the engine 121 and CIMG 123C is reduced (trace T4). The blending of brake torque and negative drive torque in this manner is performed in such a manner as to ensure that the rate of deceleration of the vehicle 100 remains substantially constant during the gear change as illustrated by trace T1.

Figure 4:
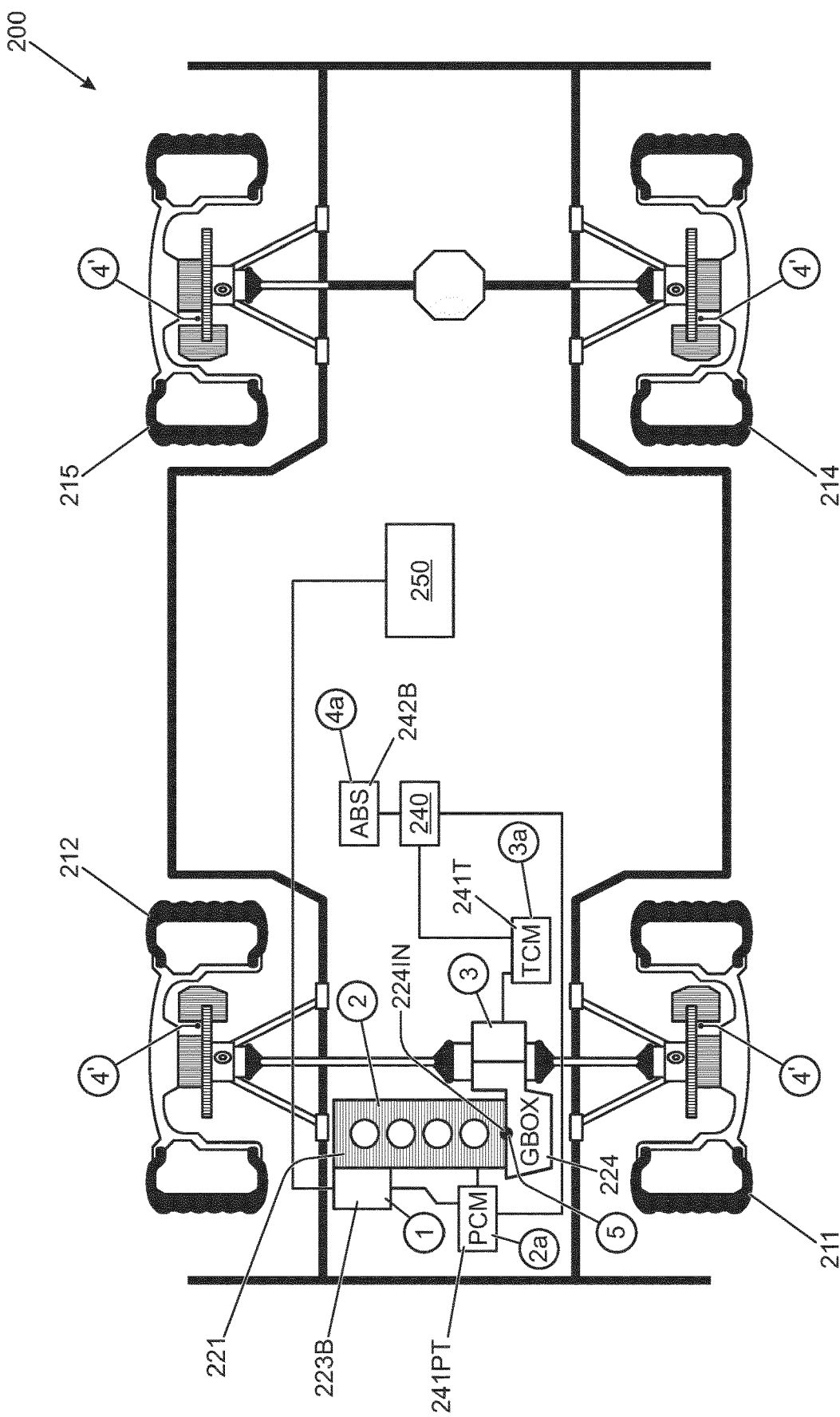
FIG. 4 is a schematic illustration of a hybrid electric vehicle according to a further embodiment of the present invention.

In some alternative embodiments, instead of having a CIMG 123C, the vehicle may instead have a belt integrated starter/generator (BISG). FIG. 4 shows a 'mild' hybrid electric vehicle 200 according to an embodiment having a BISG 223B instead of a CIMG 123C. Like features of the embodiment of FIG. 4 to those of the embodiment of FIG. 1 are shown with like reference signs incremented by 100.

In the embodiment of FIG. 4, vehicle controller 240 controls the vehicle 200 in a similar to the controller 140 of FIG. 1, except that the BISG 223B is substantially permanently coupled to the engine 221, rotating therewith, and is configured to apply positive, negative or substantially zero torque to the engine 221 under the control of the powertrain controller 241PT. The powertrain controller 241PT is in turn controlled at least in part by means of vehicle controller 240. The powertrain controller 141PT is configured to allow the engine 221 and BISG 223B to provide overrun braking such that the BISG 223B provides regenerative braking to recharge charge storage module 250, in a similar manner to the vehicle 100 of FIG. 1.

Embodiments of the present invention allow regenerative overrun braking functionality to be performed in which an electric machine is arranged to provide overrun braking when an accelerator pedal is released even in vehicles having a transmission requiring non-negative torque at an input thereof during certain gear changes. This is because vehicles according to embodiments of the present invention accommodate the requirement for non-negative torque by providing non-negative torque at the transmission input during certain gear changes, whilst compensating for the associated change in powertrain torque by applying brake torque such that a substantially constant amount of negative powertrain torque is provided during the period immediately before, during and immediately after the gear change. As noted above, the brake torque may be provided by means of a friction-based foundation braking system or any other suitable braking means, such as an electric machine downstream of the transmission in a torque path from the transmission to one or more wheels. Such an electric machine may for example be comprised by an axle of the vehicle such as a rear axle, as for example in an electric rear-axle drive (ERAD) arrangement, or by means of wheel hub-mounted electric machines or the like. Other arrangements may be useful in some embodiments.

While certain embodiments of the invention have been described above in the form of a hybrid electric vehicle, it will be appreciated that the techniques described herein are equally applicable to an electric-only vehicle which does not utilise an engine, but relies only on electric motors to provide torque.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a hybrid vehicle having an engine and at least one electric machine, wherein each of the engine and the at least one electric machine are configured to cause torque to be applied to an input shaft of a transmission, the control system comprising an electronic controller configured to:
   cause a net negative drive torque to be applied by the engine and the at least one electric machine to the input shaft of the transmission in a direction opposing travel of the vehicle in order to effect braking;
   determine when a transmission gear shift is about to take place requiring a non-negative torque to be applied at the input shaft of the transmission; and
   when a net negative drive torque is being applied to the input shaft of the transmission and it is determined that a gear shift is about to take place requiring a non-negative torque to be applied, temporarily cause a net non-negative drive torque to be applied to the input shaft by causing the at least one electric machine to apply a positive drive torque to the input shaft of the transmission sufficient to compensate for negative torque applied by the engine and cause brake force to be applied to one or more wheels of the vehicle by a second braking system to compensate for a reduction in negative drive torque applied to the input shaft of the transmission, while the transmission gear shift takes place.

2. The system according to claim 1, wherein the electronic controller is further configured to receive a drive demand signal indicative of an amount of drive torque required of a powertrain of the vehicle, and to cause negative drive torque to be applied by at least one of the electric machine in dependence on the drive demand signal.

3. The system according to claim 1, wherein the electronic controller is further configured to receive a brake force demand signal indicative of an amount of brake force required, and to cause negative drive torque to be applied by the at least one electric machine in dependence on the brake force demand signal.

4. The system according to claim 1, wherein the electronic controller is further configured to command application of brake torque by the second braking system, to compensate for the reduction in negative drive torque applied to the input shaft of the transmission, a predetermined time period prior to the transmission gear shift taking place.

5. The system according to claim 1, the electronic controller comprising an electronic processor having an electrical input configured to receive a signal indicating that a transmission gear shift is about to take place requiring a non-negative torque to be applied at the input shaft of the transmission, and an electronic memory device electrically coupled to the electronic processor and having instructions stored therein,
   wherein the processor is configured to access the memory device and execute the instructions stored therein such that the processor is operable to determine, based on the received signal, when a transmission gear shift is about to take place requiring a non-negative torque to be applied at the input shaft of the transmission, and, when a net negative drive torque is being applied to the input shaft of the transmission and it is determined that a gear shift is about to take place requiring a non-negative torque to be applied, temporarily cause a net non-negative drive torque to be applied to the input shaft by causing the at least one electric machine to apply a positive drive torque to the input shaft of the transmission sufficient to compensate for negative torque applied by the engine and cause brake force to be applied to the one or more wheels of the vehicle by the second braking system to compensate for the reduction in negative drive torque applied to the input shaft of the transmission, while the transmission gear shift takes place.

6. A hybrid motor vehicle comprising the control system according to claim 1.

7. A method of controlling a hybrid vehicle having an engine and at least one electric machine, wherein each of the engine and the at least one electric machine are configured to cause torque to be applied to an input shaft of a transmission, the method implemented by a control system and comprising:
   causing a net negative drive torque to be applied by the engine and the electric machine to the input shaft of the transmission in a direction opposing travel of the vehicle in order to effect braking;
   determining when a transmission gear shift is about to take place requiring a non-negative torque to be applied at the input shaft of the transmission; and
   when a net negative drive torque is being applied to the input shaft of the transmission and it is determined that a gear shift is about to take place requiring a non-negative torque to be applied, temporarily causing a net non-negative drive torque to be applied to the input shaft by causing the at least one electric machine to apply positive torque to the input shaft of the transmission and causing brake force to be applied to one or more wheels of the vehicle by a second braking system to compensate for a reduction in negative drive torque applied to the input shaft of the transmission, while the transmission gear shift takes place.

8. The method according to claim 7, further comprising commanding application of brake torque by the second braking system, to compensate for the reduction in negative drive torque applied to the input shaft of the transmission, a predetermined time period prior to the transmission gear shift taking place.

9. The method according to claim 8, further comprising determining when the transmission gear shift will take place in dependence at least in part on information indicative of an instant speed of the transmission, and information indicative of a speed of the transmission at which a gear shift will take place.

10. A computer program product, comprising a non-transitory computer readable storage medium having encoded thereon instructions that, when executed on a processor, cause the processor to implement the method of claim 7.

* * * * *